H. B. THOMAS.
ROTARY ENGINE.

No. 22,832. Patented Feb. 1, 1859.

Witnesses:

Inventor:
H B Thomas

UNITED STATES PATENT OFFICE.

H. B. THOMAS, OF PORTAGE CITY, WISCONSIN.

ROTARY STEAM-ENGINE.

Specification of Letters Patent No. 22,832, dated February 1, 1859.

*To all whom it may concern:*

Be it known that I, HENRY B. THOMAS, of Portage City, in the county of Columbia and State of Wisconsin, have invented a new and useful Improvement in Rotary Engines; and I do hereby declare that the following is a full, clear, and exact description of the same, reference being had to the accompanying drawings, forming part of this specification, in which—

Figure 1:
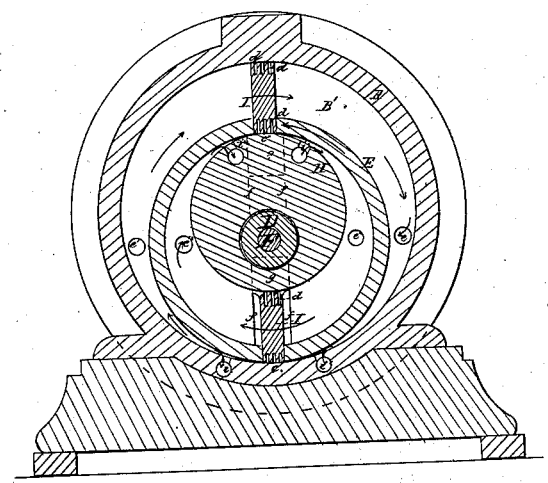
Figure 2:
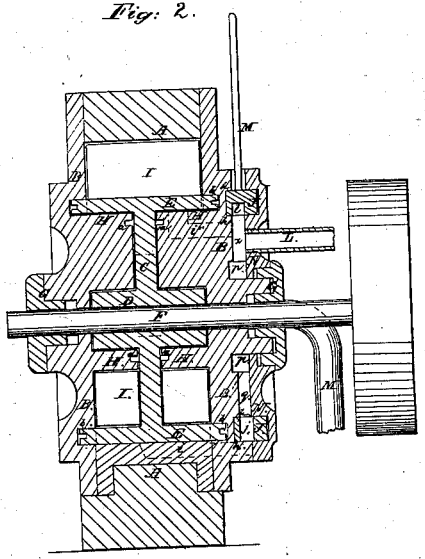
Figure 3:
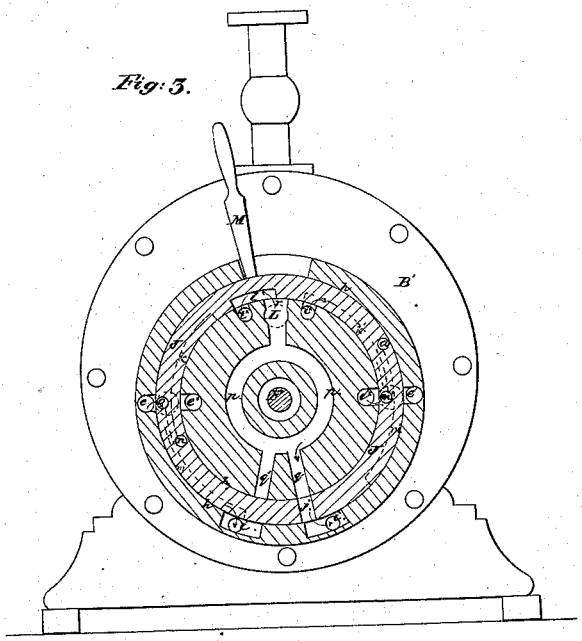
Figure 4:
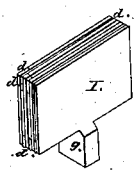

Figure 1 is a vertical section, in a plane perpendicular to the axis, right through the piston wheel and cylinders of a rotary steam-engine constructed according to my invention. Fig. 2 is a vertical section of the same, in a plane passing directly through the shaft. Fig. 3 is a vertical section of the same, in the plane indicated by the line $x, x$, of Fig. 1, passing directly through the reversing valve. Fig. 4 is a perspective view of one of the sliding pistons.

Similar letters of reference indicate corresponding parts in all the figures.

My invention consists in so constructing and combining a piston wheel and two eccentric cylinders, one outside and the other inside of said wheel, with a proper arrangement of passages, that the portions of the radial sliding pistons that are inside of the wheel, as well as the portions that are outside thereof, are rendered effective in the operation of the engine, and the engine is made double-acting.

This improvement is applicable to rotary engines to be used as motors or to those used as pumps for raising or forcing water.

It also consists in a certain arrangement of passages in the engine and in a reversing valve for causing the reversal of the direction of rotation of the engine.

To enable others skilled in the art to fully understand my invention, I will proceed to describe its construction and operation in a steam engine, and a few remarks will serve to illustrate its application as a pump or steam engine and pump combined.

A, is the outer cylinder of the engine, which is bored out truly and fitted with heads B, B', one or both of which must be movable.

F is the main shaft to which is keyed the piston wheel C, D, E, which is composed of a disk or plate C, having a hub D, and a cylindrical rim E, projecting from each side of it as shown in Fig. 2. The shaft F passes through stuffing-boxes G, G, in the cylinder heads in a direction parallel with the axis of the cylinder, but in a position eccentric thereto so that the outer periphery of the piston wheel which is concentric to the shaft works in contact with the inner periphery of the outer cylinder. The rim E is made broad enough to enter grooves provided for it in the cylinder heads, and has its edges fitted with packing rings $b, b$, as shown in Fig. 2, to make it work steam tight with the backs of said grooves.

H, H, indicate the inner cylinder, concentric with the outer one and having its outer periphery in contact with the inner periphery of the cylindrical rim E, of the piston wheel opposite to where the latter is in contact with the outer cylinder. This cylinder H, H, is made in two parts in order to admit the center plate C, of the piston wheel, the said parts being cast or bolted one to each cylinder head, and being fitted with packing rings $a, a$, as shown in Fig. 2, to make a close working joint with the sides of the center plate C. The two parts H, H, of the said inner cylinder have cavities provided in them to receive the hub D of the piston wheel. The inner and outer cylinders may be fitted with packing pieces at the places $c, c^*$, where the piston wheel comes in contact and the said packing pieces should have springs applied to them to keep them in contact with the wheel and compensate for wear.

I, I, are the pistons of which there may be any number, consisting of flat plates of metal arranged radially to the axis of the piston wheel. These pistons are fitted to slide through slots provided for them in the piston wheel and also to the pheripherical surfaces of the inner and outer cylinders and to the cylinder heads and their sides and ends are grooved to receive packing pieces $d, d$, as shown in Fig. 1, to keep them tight with the pheripherical surfaces of the two cylinders and with the cylinder heads. The ends of said pistons are rounded as shown in Fig. 1, sufficiently to provide for their movement relatively to the cylinders produced by the eccentricity of the wheel and insure their always having a proper bearing. The slots provided in the piston wheel to receive the pistons are widened inside of the rim as shown at $f, f$, in Fig. 1, and the pistons are made each with a shank $g$, as shown in Figs. 1 and 4, wide enough to fit the wider portions of the slots but no thicker than the center plate C. The induction and eduction passages all pass through the cylinder head B'.

$i$, $i''$, are induction passages entering the space between the outer cylinder and the piston wheel, one on each side of and near the point or line of contact $c$.

$e$, $e'$, are eduction passages so arranged that between the outer cylinder and piston wheel, two opposite pistons in passing them will be projected to similar distances from the piston-wheel.

$i^*$ $i^{1*}$, are induction passages entering the space between the rim of the piston wheel and the inner cylinder, one on each side of and near the point or line of contact $c^*$.

$e^*$ $e^{1*}$, are eduction passages communicating with the space between the inner cylinder H, and piston wheel E.

The whole of these passages communicate as shown in Fig. 3, with an annular cavity $h$, $h$, within the cylinder head B', which cavity constitutes the seat for and is fitted with a ring valve J, whose transverse section is of square form as shown in Fig. 2. The ring valve has one opening $j$, directly through it as shown in Figs. 2 and 3. It has also two long cavities $k$, $k'$, (dotted in Fig. 3) and a shorter one $l$, all in its interior peripherical surface; and it has two long cavities $m$, $m'$, in its exterior peripherical surface; and from the cavities $k$, $k'$, and $m$, $m'$, there are openings $n$, $n'$, and $o$, $o'$, leading into the outer flat face of the valve. The annular cavity $h$, $h$, is covered by and partly formed within a circular bonnet N, which is bolted on the outside of the cylinder head B', and which also covers a small annular cavity $p$, $p$, in the cylinder head B'. From this cavity $p$, $p$, there are passages $q$, $q'$, and $r$, all leading to the cavity $h$, $h$; the former entering the said cavity $h$, $h$, near the passages $i$, and $i'$, and the latter between the passages $i^*$, and $i^{1*}$. The induction pipe L of the engine is connected with the cylinder head opposite to the passage $r$, which is always in communication with the cavity $p$, $p$, and passages $q$, $q'$, which passage and cavities are therefore always full of live steam when the engine is in operation; and there are two eduction pipes M, connecting with the cylinder head B', one on each side of the shaft F, in such positions that by turning the valve by a handle M', either of the two openings $o$, and $n'$, or the two $o'$, and $n$, can be brought opposite and into communication with the said eduction pipes, one with each. Only one eduction pipe is shown in the drawing; see Fig. 2. In Fig. 3, both are removed with the bonnet N. In Fig. 3 $o$, and $n'$, are represented in position to communicate with the eduction pipes, one with each. The two eduction pipes may be connected with one main exhaust pipe. The cavities $k$, $k'$, and $m$, $m'$, serve to form communication between the eduction passages $e$, $e^*$, and the passages $o$, and $n$, and between the eduction passages $e'$, $e'^*$, and the passages $o'$, and $n'$. When $o$, and $n'$, are opposite the exhaust pipes, the passages $e$, and $e'^*$, are open and $e^*$, $e'$, closed, and at the same time the steam cavity $l$, in the valve forms a communication between the steam passage $r$, and the induction passage $i^*$; and the steam passage $q$, forms a communication between the passage $r$, and the induction passages $i'$, and the induction passages $i'$, and $i'^*$ are closed to the steam as shown in the drawing. The several passages and cavities are so arranged that when the valve is shifted to open the passages $i'$, and $i'^*$, to the steam, the passages $n$, and $o'$, come opposite the eduction pipes and open the eduction passages $e^*$, $e'^*$; and the eduction cavities $k$, and $k'$, and $m$, $m'$, are long enough to be brought into communication with the induction ports $i$, $i'$, $i^*$, $i'^*$, which are closed to the steam, so that said ports are made to serve also as eduction ports in connection with the eduction ports $e$, $e'$, and $e^*$, $e'^*$, and thereby to prevent any back pressure ever being created on the pistons by confining the exhaust steam between them and the places where the piston-wheel and cylinders work in contact.

When the valve is in the position illustrated in Fig. 3, and hereinbefore described, the steam enters the chambers between the two cylinders and the piston wheel by the passages $i$, and $i^*$, and leaves it by the passages $e$, $i'^*$, $e'^*$, $i'^*$, as indicated by red arrows in Fig. 1, and the entering steam acts between the pistons and the eccentric surfaces of both of the cylinders to drive the pistons and their wheel in the direction indicated by the black arrows shown upon them in Fig. 1, thus obtaining the action of the steam on every portion of the surface of the pistons except those portions that are contained within the slots in the piston wheel, and making the engine double-acting as compared with ordinary rotary engines in which only the portion of the piston outside of the piston wheel is made effective.

By shifting the valve J, to open the passages $i^*$, $i'^*$, to the steam pipe and $e^*$, $e'$, to the exhaust pipes, the motion of the engine is reversed; and by bringing it midway between the latter position and the position shown in the drawing, all the cylinder passages will be closed and the engine stopped.

By connecting a suction pipe in place of the induction steam pipe L, and a discharge pipe in place of the eduction pipes M, and giving rotary motion to the shaft F, by any suitable means the engine will, it is obvious, work as a pump, the water entering at $i$, $i^*$, and discharging at $e$, $e'^*$, and $i'$, $i'^*$, or entering at $i$, $i'^*$, and discharging at $e'$, $e^*$, and $i$, $i^*$, according to which way the valve is set and to the direction of revolution. The valve J, is however unnecessary for the pump, and a series of stationary passages may take the place of one of the two sets of passages shown in the drawing.

This kind of double-acting rotary engine may have steam used in the space between the piston wheel and inner cylinder, and have water pipes connected with the space between the piston wheel and outer cylinder, or vice versa, and thus be made to constitute a steam pump. Or the engine may be used as a double-acting steam-engine as described, but have a set of water pipes connected with the space inside or that outside the piston wheel; so that by closing one set of steam passages and opening the said water pipes, the steam engine may be temporarily converted into a fire-engine in case of need.

I do not claim the arrangement of the revolving piston wheel of a rotary engine or pump eccentrically within and in contact with the external cylinder. But

What I claim as my invention and desire to secure by Letters-Patent is:—

1. So constructing and combining a piston wheel and sliding pistons with two eccentric cylinders, one outside and the other inside the said wheel, that with a proper arrangement of induction and eduction passages, those parts of the pistons within the rim of the wheel, as well as those without, are rendered effective in the operation of the engine as herein described, and it is thereby rendered double-acting, either in its employment as a motor or as a pump or as a combined motor and pump.

2. The combined arrangement herein described of the passages and cavities in the cylinder head B', ring valve J, and bonnet N.

H. B. THOMAS.

Witnesses:
C. E. BRITT,
G. T. CORNES.